US012617719B2

(12) United States Patent
Hsu et al.

(10) Patent No.: US 12,617,719 B2
(45) Date of Patent: May 5, 2026

(54) SYNTHETIC GYPSUM AND GYPSUM BOARDS PRODUCED THEREFROM

(71) Applicant: UNIVERSAL CEMENT CORPORATION, Taipei (TW)

(72) Inventors: Feng-Shuo Hsu, Taipei (TW); Chih-Yuan Hou, Taipei (TW)

(73) Assignee: UNIVERSAL CEMENT CORPORATION, Taipei (TW)

( * ) Notice: Subject to any disclaimer, the term of this patent is extended or adjusted under 35 U.S.C. 154(b) by 167 days.

(21) Appl. No.: 18/301,259

(22) Filed: Apr. 17, 2023

(65) Prior Publication Data

US 2024/0343643 A1    Oct. 17, 2024

(51) Int. Cl.
| | |
|---|---|
| *C04B 11/00* | (2006.01) |
| *C04B 11/024* | (2006.01) |
| *C04B 28/14* | (2006.01) |
| *C04B 111/00* | (2006.01) |

(52) U.S. Cl.
CPC .......... *C04B 11/005* (2013.01); *C04B 11/024* (2013.01); *C04B 28/146* (2013.01); *C04B 2111/00137* (2013.01); *C04B 2111/0062* (2013.01)

(58) Field of Classification Search
CPC ....... C04B 11/00; C04B 11/005; C04B 28/00; C04B 28/145; C04B 28/14; B28B 17/023; B32B 13/08
See application file for complete search history.

(56) References Cited

U.S. PATENT DOCUMENTS

| | | | | |
|---|---|---|---|---|
| 3,929,416 A | * | 12/1975 | Tanaka .................... | C01F 11/46 |
| | | | | 366/156.1 |
| 5,562,892 A | * | 10/1996 | Kirk ...................... | C04B 11/024 |
| | | | | 106/772 |
| 2009/0273113 A1 | * | 11/2009 | Baig ..................... | C04B 28/145 |
| | | | | 451/28 |
| 2019/0322584 A1 | * | 10/2019 | Sang ................... | C04B 40/0039 |
| 2022/0259098 A1 | * | 8/2022 | Ballard .................. | C04B 24/10 |

FOREIGN PATENT DOCUMENTS

| | | | | | |
|---|---|---|---|---|---|
| EP | 3599227 A1 | * | 1/2020 | ............ | C01F 11/466 |
| EP | 2061731 B1 | * | 4/2020 | ........... | C04B 11/007 |

OTHER PUBLICATIONS

Kadono (Machine Translation of JP2016138006) (Year: 2016).*

* cited by examiner

*Primary Examiner* — Michael A Tolin
*Assistant Examiner* — Hana C Page
(74) *Attorney, Agent, or Firm* — HAUPTMAN HAM, LLP

(57) ABSTRACT

This invention discloses a synthetic gypsum and gypsum boards produced therefrom. Limestone (Calcium Carbonate), slaked lime (calcium hydroxide), water, and sulfuric acid are mixed, and alpha hemihydrate gypsum is optionally added as crystal seed to produce synthetic gypsum. The synthetic gypsum is then used to make gypsum boards. The gypsum board produced according to this invention contains at least 10% alpha hemihydrate gypsum.

17 Claims, No Drawings

SYNTHETIC GYPSUM AND GYPSUM BOARDS PRODUCED THEREFROM

BACKGROUND

Technical Field

The present invention relates to a synthetic gypsum and a gypsum board made from the synthetic gypsum, particularly a gypsum board containing alpha-hemihydrate gypsum.

Description of Related Art

Traditional gypsum boards do not contain alpha-hemihydrate gypsum, and their strength is relatively low. To meet the requirements of modern construction, the development of a new generation of high-strength gypsum boards has always been the focus of efforts by gypsum board manufacturers.

DETAILED DESCRIPTION OF THE INVENTION

If gypsum ($CaSO_4 \cdot 2H_2O$) is simply produced by reacting limestone ($CaCO_3$) with sulfuric acid ($H_2SO_4$), the resulting gypsum tends to recrystallize on the surface of the original limestone to form a layer of gypsum with low solubility. When the gypsum completely covers the original limestone core, the reaction will gradually stop at a temperature of about 45 degrees Celsius. To continue the reaction between the core limestone and sulfuric acid, an external heat source must be used so that the mixture can be stirred at higher temperatures to break the encapsulating gypsum layer in order to continue the reaction until completion.

Taking room temperature at 25 degrees Celsius as an example: as the ratio of slaked lime increases, the process temperature also increases. For example, when limestone and slaked lime are mixed in a ratio of 2:1, the process temperature can be raised to above 45 degrees Celsius; when limestone and slaked lime are mixed in a ratio of 2:8, the process temperature can reach near 80 degrees Celsius. Therefore, the present invention uses a mixture of slaked lime and limestone as raw materials to produce synthetic gypsum under normal pressure and chemical internal heat, neither external pressure nor external heat source is needed, which can achieve energy-saving and carbon reduction.

The present invention further discloses manufacture of high-strength gypsum boards containing alpha-hemihydrate gypsum from the disclosed synthetic gypsum. The gypsum boards manufactured by the present invention contain more than 10% alpha-hemihydrate calcium sulfate.

The chemical reactions related to the present invention are described as follows:

Calcium Sulfate Dihydrate ($CaSO_4 \cdot 2H_2O$), commonly known as gypsum or dihydrate gypsum, which loses 1.5 crystalline water molecules and forms hemihydrate gypsum ($CaSO_4 \cdot \frac{1}{2} H_2O$) upon heating:

$$CaSO_4 \cdot 2H_2O \rightarrow CaSO_4 \cdot \frac{1}{2}H_2O + 3/2H_2O$$

Hemihydrate gypsum can be further divided into alpha-hemihydrate and beta-hemihydrate:

Heating dihydrate gypsum to around 97° C. leads to the formation of alpha-hemihydrate gypsum, which has a regular rhombic crystal shape. Heating dihydrate gypsum to around 45° C. leads to the formation of beta-hemihydrate gypsum, which has a loose and porous solid structure.

Calcium Carbonate ($CaCO_3$) reacts with Sulfuric acid and water to produce dihydrate gypsum and carbon dioxide:

$$CaCO_3(aq) + H_2SO_4(aq) + H_2O(l) \rightarrow CaSO_4 \cdot 2H_2O \downarrow + CO_2(g) \uparrow \Delta H =$$

$$-306.98 \text{ kJ/mol}$$

Calcium hydroxide ($Ca(OH)_2$) reacts with sulfuric acid to produce dihydrate gypsum:

$$Ca(OH)_2(aq) + H_2SO_4(aq) \rightarrow CaSO_4 \cdot 2H_2O \downarrow \Delta H = -428.59 \text{ kJ/mol}$$

The present invention has found that gypsum boards containing alpha-hemihydrate gypsum have significantly increased physical strength compared to traditional gypsum boards that do not contain alpha-hemihydrate gypsum. Please refer to Table 1: Comparison of Physical Properties.

TABLE 1

| | Comparison of Physical Properties. | |
|---|---|---|
| | Tested Items | |
| | The present disclosed Gypsum Board (containing alpha-hemihydrate gypsum over 10%) | Traditional Gypsum Boards (without containing alpha-hemihydrate gypsum) |
| Thickness | 15 mm | 15 mm |
| Longitudinal bending breaking load | 970 N | 910 N |
| Transverse bending breaking load | 580 N | 310 N |
| Impact resistance | hammer height 800 mm, diameter of the depression less than 20 mm, and no crack through the back. | hammer height 800 mm, diameter of the depression less than 25 mm, and no crack through the back. |
| Nailed side surface load | 825 N | 750 N |

Table 1 shows a comparison of the physical properties between the gypsum board of the present invention and conventional gypsum board, which includes at least the following advantages:

(1) The longitudinal bending breaking load of the present invention gypsum board is 970 N, which is better than the conventional gypsum board at 910 N.

(2) The transverse bending breaking load of the present invention gypsum board is 580 N, which is better than the conventional gypsum board at 310 N.

(3) The present invention gypsum board has better impact resistance, with a dent diameter below 20 mm, compared to the conventional gypsum board with a dent diameter below 25 mm.

(4) The Nailed side surface load of the present invention gypsum board is 825 N, which is better than the conventional gypsum board at 750 N.

The present invention mixes limestone (Calcium Carbonate) and slaked lime (calcium hydroxide) in a specific ratio, and adds a predetermined amount of alpha-hemihydrate gypsum as a crystal seed for dihydrate calcium sulfate in the suspension. Under normal pressure and self-exothermic heat conditions, the mixture is reacted with sulfuric acid to synthesize dihydrate gypsum. The entire process is carried out under normal pressure and self-exothermic heat, without external heating, while controlling the concentration of reactants, pH value, drying and reaction time, to produce synthetic gypsum.

The composition analysis of the dihydrate gypsum produced by the present invention is as follows:

Synthetic gypsum analysis 1, free water analysis:

Weigh about 50 g of gypsum sample on a weighing dish and dry it at 45° C. until the weight is constant. Calculate the free water %.

Synthetic gypsum analysis 2, crystalline water % and conversion purity:

Continuing from analysis 1, weigh 1 g of gypsum and dry it at 220° C. until the weight is constant. Calculate the crystalline water % and conversion purity.

Synthetic gypsum analysis 3: Calculation of alpha-hemihydrate content %, beta-hemihydrate content %, dihydrate content %, and impurity content %:

Continuing from Synthetic gypsum analysis 1.5 g of gypsum sample is weighed and hydrated with water until the sample is completely immersed in water. The sample is then left to stand at room temperature for about 48 hours, and then dried in an oven at 45° C. until a constant weight is reached to calculate the beta-hemihydrate content %. The sample is then dried in an oven at 97° C. until a constant weight is reached to calculate the alpha-hemihydrate content %. The dihydrate content % and impurity content % are then calculated separately using a gypsum composition analyzer.

Wherein, synthetic gypsum analysis 1 and synthetic gypsum analysis 2 are carried out according to ASTM C471M analysis method. The third analysis of synthetic gypsum uses a gypsum phase composition analyzer.

ASTM-C471M standard refers to:

ASTM-C471M Standard Test Methods for Chemical Analysis of Gypsum and Gypsum Products (Metric).

A gypsum board is also disclosed according to the present invention. The method of producing the gypsum board includes:

Step 1: Mixing limestone (Calcium Carbonate) and slaked lime (calcium hydroxide) in a ratio of 2:1~8, adding water to make a suspension with a solid concentration of 20%~40%, and add 0.3%~5% alpha-hemihydrate as a crystal seed of dihydrate gypsum.

Step 2: Slowly adding 20%~60% sulfuric acid solution in a volume equal to about 1~1.5 times the molar amount of Calcium under normal pressure, and stirring at 150~500 rpm. The water temperature will continue to rise to 25~50 degrees Celsius and gas will be produced until gas production stops.

Step 3: Centrifuging dehydrating, mixing with 1~3 times the amount of water, add 20%~35% dilute sulfuric acid solution, stirring at 150~500 rpm until the pH is 3~5, let it settle and precipitate, then centrifuging and dehydrating, and washing with water three times. Drying at 105 degrees Celsius for about 2~3 hours to produce synthetic gypsum.

The composition analysis of the synthetic gypsum produced by this invention is as follows: Free water below 10%; $CaSO_4 \cdot 2H_2O$ above 95%; particle size above 150 μm; pH value 5~8. The alpha-hemihydrate content is about 20%~80%, and the rest is beta-hemihydrate and impurities. The pH is measured by the following method: Taking 10 g of gypsum sample, adding water to 100 g, stirring with a magnetic stirrer, and recording the pH value after stabilization.

Step 4: The synthetic gypsum is dried, ground, calcined to form gypsum powder containing 10~50% alpha hemihydrate calcium sulfate, and then pulverized and stored.

Step 5: Gypsum slurry is formed by mixing gypsum powder, water, and auxiliary materials such as hardening agents, foaming agents, water-reducing agents, starch, retarders, etc.

Step 6: A top or face paper and a bottom or back paper are provided on the upper and lower sides respectively, and gypsum slurry is injected to form continuous wet boards, which are hardened, wet boards transfer handling and cutting, dried in a drying oven, and cut and trimmed to produce gypsum boards. According to the ASTM-C471M standard, the gypsum board produced by the present invention contains more than 10% alpha hemihydrate calcium sulfate.

The limestone (Calcium Carbonate) used in the present invention can be replaced with substances containing Calcium Carbonate, including minerals such as limestone, marble, Iceland spar or biological calcium oyster shell powder, etc.

The slaked lime $(Ca(OH)_2)$ used in the present invention can be replaced with quicklime (CaO(s)) because slaked lime is produced by adding water to quicklime: $CaO(s) + H_2O(l) \rightarrow Ca(OH)_2(s)$.

While several embodiments have been described by way of example, it will be apparent to those skilled in the art that various modifications may be configured without departing from the spirit as defined by the appended claims.

What is claimed is:

1. A process of producing synthetic gypsum, the process comprising:

step 1 which comprises mixing Calcium Carbonate $(CaCO_3)$ and one of Calcium Hydroxide $(Ca(OH)_2)$ and Calcium Oxide (CaO) in a predetermined ratio, and adding water to form a suspension with a predetermined percentage of solid content; and step 2 which comprises adding sulfuric acid under normal pressure, and stirring the suspension and the added sulfuric acid, wherein during step 2, a temperature of the suspension rises, gas is generated, and gypsum is precipitated, and wherein synthetic gypsum is obtained after drying, wherein the synthetic gypsum, in a composition analysis according to ASTM-C471M standards, comprises: free water less than 10%, $CaSO_4 \cdot 2H_2O$ over 95%, particle size over 150 μm, and pH 5~8, wherein in step 1, a predetermined amount of alpha-hemihydrate gypsum is added to the suspension as a crystal seed of dihydrate gypsum, and wherein the synthetic gypsum, in the composition analysis according to ASTM-C471M standards, further comprises: alpha-hemihydrate gypsum 20%~80%.

2. The process according to claim 1, wherein in step 1, the predetermined ratio of Calcium Carbonate ($CaCO_3$) and the one of Calcium Hydroxide ($Ca(OH)_2$) and Calcium Oxide (CaO) is in a range of 2:1~8.

3. The process according to claim 1, wherein in step 1, the predetermined percentage of solid content of the suspension after said adding water is in a range of 20%~40%.

4. The process according to claim 1, wherein the predetermined amount of alpha-hemihydrate gypsum added is in a range of 0.3%~5%.

5. The process according to claim 1, wherein in step 2, the sulfuric acid added is a 20%~60% sulfuric acid solution, in a volume equivalent to 1~1.5 times a molar amount of Calcium.

6. The process according to claim 1, wherein in step 2, after the sulfuric acid is added, a solution including the suspension and the added sulfuric acid is further adjusted to a pH of 3~5 with dilute sulfuric acid.

7. The process according to claim 1, wherein an entirety of the process is carried out under normal pressure self-exothermic heat, and requires no external heating.

8. A process of producing synthetic gypsum, the process comprising:

step 1 which comprises mixing Calcium Carbonate ($CaCO_3$) and one of Calcium Hydroxide ($Ca(OH)_2$) and Calcium Oxide (CaO) in a ratio of 2:1~8, with water to form a suspension with 20%~40% solid content;

step 2 which comprises adding a 20%~60% sulfuric acid solution at normal pressure in a volume equivalent to 1~1.5 times a molar amount of Calcium, and stirring and mixing the sulfuric acid solution with the suspension, wherein, during step 2, a temperature of a mixture of the sulfuric acid solution and the suspension continues to rise and gas is produced, until gas production stops, to obtain an intermediate product; and step 3 in which:

the intermediate product is centrifuged to be dehydrated, the dehydrated intermediate product is mixed and stirred with water and a dilute sulfuric acid solution to obtain a product of pH of 3~5, the product of the pH of 3~5 is allowed to settle and precipitate, the settled and precipitated product is centrifuged to be dehydrated, and then washed with water, and the washed product is dried to produce synthetic gypsum.

9. The process according to claim 8, wherein in step 1, an amount of alpha-hemihydrate gypsum in a range of 0.3%~5% is added to the suspension as a crystal seed for dihydrate gypsum.

10. The process according to claim 9, wherein the synthetic gypsum, in a composition analysis according to ASTM-C471M standards, comprises:

free water less than 10%, $CaSO_4 \cdot 2H_2O$ over 95%, particle size over 150 μm, pH 5~8, and alpha-hemihydrate gypsum 20-80%.

11. A process of producing a gypsum board, comprising:

step 1 which comprises mixing a predetermined ratio of Calcium Carbonate ($CaCO_3$) and one of Calcium Hydroxide ($Ca(OH)_2$) and Calcium Oxide (CaO), and adding water to form a suspension with a predetermined concentration of solid;

step 2 which comprises adding a sulfuric acid solution of a predetermined concentration under normal pressure and in a volume equivalent to a predetermined multiple of a molar amount of Calcium, and stirring the sulfuric acid solution with the suspension, wherein, during step 2, a temperature of a mixture of the sulfuric acid solution and the suspension continues to rise and gas is generated, until the gas production stops, to obtain an intermediate product;

step 3 in which:

the intermediate product is centrifuged to be dehydrated, the dehydrated intermediate product is mixed with water and a dilute sulfuric acid solution to obtain a product of pH of 3~5, the product of the pH of 3~5 is allowed to settle, the settled product is centrifuged to be dehydrated, and then washed with water, and the washed product is dried to produce synthetic gypsum;

step 4 which comprises:

drying, grinding, and calcining the synthetic gypsum to produce 10~50% alpha-hemihydrate calcium sulfate plaster powder, and then pulverizing and storing the alpha-hemihydrate calcium sulfate plaster powder;

step 5 which comprises forming a gypsum slurry by mixing the alpha-hemihydrate calcium sulfate plaster powder, water, and auxiliary materials; and step 6 in which:

the gypsum slurry is injected into a paper-lined mold, with a top or face paper and a bottom or back paper, to form continuous wet boards, and the wet boards are hardened, transferred, cut, dried, and trimmed to produce gypsum boards.

12. The process according to claim 11, wherein in step 1, a predetermined amount of alpha-hemihydrate gypsum is added to the suspension as a crystal seed of dihydrate gypsum.

13. The process according to claim 12, wherein in step 1, the predetermined amount of alpha-hemihydrate gypsum is 0.3%~5%.

14. The process according to claim 12, wherein the gypsum board, in a composition analysis according to ASTM-C471M standards, comprises at least 10% of alpha-hemihydrate calcium sulfate.

15. A process of producing a gypsum board, comprising:

step 1 which comprises mixing Calcium Carbonate ($CaCO_3$) with one of calcium hydroxide ($Ca(OH)_2$) and calcium oxide (CaO) in a ratio of 2:1~8, and adding water to form a suspension with a solid concentration of 20%~40%;

step 2 which comprises adding a 20%~60% sulfuric acid solution at normal pressure in a volume equivalent to 1~1.5 times a molar amount of calcium, and stirring and mixing the sulfuric acid solution with the suspension, wherein, during step 2, a temperature of a mixture of the sulfuric acid solution and the suspension rises and gas is generated, until gas production stops, to obtain an intermediate product;

step 3 in which:

the intermediate product is centrifuged to be dehydrated, the dehydrated intermediate product is mixed and stirred with water and a dilute sulfuric acid solution to obtain a product of pH of 3~5, the product of the pH of 3~5 is allowed to settle and precipitate, the settled and precipitated product is centrifuged to be dehydrated, and then washed with water, and the washed product is dried to produce synthetic gypsum;

step 4 in which the synthetic gypsum is dried, ground, and calcined to produce a plaster powder containing 10~50% alpha-hemihydrate calcium sulfate, which is then pulverized and stored;

step 5 which comprises mixing the plaster powder, water, and auxiliary materials to form a gypsum slurry; and step 6 in which:

the gypsum slurry is injected into a paper-lined mold, with a top or face paper and a bottom or back paper, to form continuous wet boards, and the wet boards are hardened, transferred, cut, dried, and trimmed to produce gypsum boards.

16. The process according to claim 15, wherein in step 1, an amount of alpha-hemihydrate gypsum in a range of 0.3%~5% is added in the suspension as a crystal seed of dihydrate gypsum.

17. The process according to claim 16, wherein the gypsum board, in a composition analysis according to ASTM-C471M standards, comprises:

at least 10% of alpha-hemihydrate calcium sulfate.

\* \* \* \* \*